US006639986B2

(12) United States Patent
Kanamori et al.

(10) Patent No.: US 6,639,986 B2
(45) Date of Patent: Oct. 28, 2003

(54) BUILT-IN MICROPHONE DEVICE

(75) Inventors: Takeo Kanamori, Hirakata (JP); Takashi Kawamura, Neyagawa (JP); Satoru Ibaraki, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/334,493

(22) Filed: Jun. 16, 1999

(65) Prior Publication Data

US 2003/0161484 A1 Aug. 28, 2003

(30) Foreign Application Priority Data

Jun. 16, 1998 (JP) .......................................... 10-168113

(51) Int. Cl.[7] ............................................... H04B 15/00
(52) U.S. Cl. ..................................... 381/71.1; 381/94.7
(58) Field of Search .............................. 381/94.1, 71.1, 381/94.7, 94.2

(56) References Cited

U.S. PATENT DOCUMENTS 5,243,661 A * 9/1993 Ohkubo et al. ............ 381/94.2
5,563,954 A * 10/1996 Ono et al. ................. 381/94.7
5,690,321 A * 11/1997 Seni et al. ............. 267/140.14
5,982,429 A * 11/1999 Kamamoto et al. .......... 348/333
6,266,422 B1 * 7/2001 Ikeda ...................... 381/71.11

* cited by examiner

*Primary Examiner*—Forester W. Isen
*Assistant Examiner*—Brian Pendleton
(74) *Attorney, Agent, or Firm*—RatnerPrestia

(57) ABSTRACT

A built-in microphone device for use in an apparatus having a mechanism section generating internal noise inside a housing of the apparatus includes a main microphone for picking up an external sound; a noise reference microphone for picking up the internal noise; an adaptive filter member for generating a control audio signal based on an output signal from the noise reference microphone using a filter coefficient; a signal subtraction section for subtracting the control audio signal generated by the adaptive filter member from an output signal from the main microphone to generate a subtraction result; and a filter coefficient update control section for receiving an operation signal generated at the time of an operation of the mechanism section, and in response to the operation signal, updating the filter coefficient of the adaptive filter member based on the subtraction result generated by the signal subtraction section and an output signal from the noise reference microphone.

12 Claims, 7 Drawing Sheets

BUILT-IN MICROPHONE DEVICE

BACKGROUND OF THE INVENTION

1. Field of the Invention:

The present invention relates to a built-in microphone device for reducing the influence of internal noise of an apparatus in which the built-in microphone device is incorporated.

2. Description of the Related Art

In an audio visual apparatus, such as a video camera, having a built-in main microphone for picking up a sound, internal noise generated by a mechanism section is undesirably received by the main microphone. In order to reduce the influence of such internal noise, a built-in microphone device has been developed. A built-in microphone device includes a noise reference microphone provided in a housing of the apparatus. An internal noise signal which is output from the noise reference microphone is given to an adaptive filter, and the adaptive filter generates a control audio signal. The control audio signal is subtracted from the output signal from the main microphone. Thus, the internal noise is cancelled.

A conventional built-in microphone device operating in this manner will be described with reference to FIGS. 9 and 10. FIG. 9 is a block diagram of a conventional built-in microphone device, and FIG. 10 is a schematic isometric view of the conventional built-in microphone device shown in FIG. 9 and an audio visual apparatus, such as a video camera, in which the built-in microphone device is incorporated. FIG. 10 illustrates the positional relationship between a main microphone 1001 and a noise reference microphone 1005 of the conventional built-in microphone device.

In FIGS. 9 and 10, the main microphone 1001 is provided for picking up an external sound for recording and is provided on an outer surface of a wall of a housing 1010 of the audio visual apparatus. The housing 1010 accommodates a magnetic recording and reproduction section including a tape transfer mechanism and a rotary head. The magnetic recording and reproduction section generates internal noise and is referred to as a mechanism section 1020. The noise reference microphone 1005 is provided in the housing 1010 and is directed toward the mechanism section 1020. The noise reference microphone 1005 picks up internal noise such as sound noise caused by vibration mainly generated from the mechanism section 1020.

An adaptive filter 1030 shown in FIG. 9 identifies a transfer characteristic of internal noise transferred from the noise reference microphone 1005 to the main microphone L001. The adaptive filter 1080 also receives an internal noise signal from the noise reference microphone 1005 and generates a control audio signal based on the internal noise signal. A signal subtraction section 1040 subtracts the control audio signal generated by the adaptive filter 1030 from the output signal from the main microphone 1001. Thus, an audio signal having a reduced internal noise component is output.

The conventional built-in microphone device having ouch a structure operates as follows. The main microphone 1001, which is provided on the wall of the housing 1010. efficiently picks up external sound around the apparatus. Since the mechanism section 1020 operates at this point, internal noise, which should not be picked up, is generated. The internal noise is received by the main microphone 1001 through the housing 1010, as a result of which the signal-to-noise ratio of the sound picked up by the main microphone 1001 is lowered.

The noise reference microphone 1005 captures the internal noise generated by the mechanism section 1020. The adaptive filter 1020 estimates a signal identical with an internal noise signal received by the main microphone 1001 based an the internal noise signal output from the noise reference microphone 1005, and outputs the estimated signal as a control audio signal. The signal subtraction section 1040 subtracts the control audio signal from the output signal from the main microphone 1001, thus removing the internal noise component from the output signal. As a result, an audio signal having a reduced internal noise component is obtained. As an adaptive algorithm used by the adaptive filter 1030, a well known LMS (least means square) algorithm or the like is used.

However, the conventional built-in microphone device having the above-described structure has a problem in that a filter coefficient of the adaptive filter 1030 often is not updated optimally in practical use. For example, the filter coefficient is not converged in the condition of canceling the internal noise, resulting in time-consuming filter coefficient learning. In so-no cases, the filter coefficient is diverged, and thus the internal noise is not sufficiently cancelled.

When one internal noise source is not specified, i.e., when a plurality of internal noise sources are present, there are a plurality of transfer characteristics from the plurality of internal noise sources to the noise reference microphone 1005 and also a plurality of transfer characteristics from the plurality of internal noise sources to the main microphone 1001. Accordingly, the effect of suppressing the internal noise is difficult to obtain.

The conventional built-in microphone device has another problem in that, when the noise reference microphone 1005 picks up the external sound, the built-in microphone device adds an echo to the audio signal. This deteriorates the sound quality. These problems will be described in detail.

(1) When internal noise from the mechanism section 1020 has a sufficiently high sound pressure level, the adaptive filter 1030 accurately estimates (i.e., learns) the transfer characteristic from the noise reference microphone 1005 to the main microphone 1001. However, when the filter coefficient of the adaptive filter 1030 is updated in the, state where the level of the internal noise from the mechanism section 1020 is lower than the level of the external sound or where the operation of the mechanism section 1020 is in pause (i.e., where the level of the internal noise signal from the noise reference microphone 1005 is significantly lower than the level of the output signal from the main microphone 1001), the filter coefficient diverges from a desired characteristic. As a result, the internal noise cannot be cancelled.

(2) In the case where the mechanism section 1020 generating the internal noise operates Intermittently, for example, in the case where recording of video and audio data is started and paused repeatedly in a video camera, an internal noise signal required for learning is not obtained while the apparatus is in a pause. Accordingly, it is difficult to cancel the internal noise from the start of recording of video and audio data.

(3) In the conventional structure, the filter coefficient of the adaptive filter 1030 is converged so as to reproduce the transfer characteristic of the internal noise from the noise reference microphone 1005 to the main microphone 1001. As a result, the internal noise is cancelled. However, when either one or both of the main microphone 1001 and the noise reference microphone 1005 are vibrated, such a vibration acts as a signal disturbing the convergence of the filter coefficient. Then, the filter coefficient of the adaptive filter 1030 does not converge so as to cancel the internal noise. Accordingly, the internal noise is not cancelled.

(4) When internal noise is generated by one mechanism section 1020, the adaptive filter 1030 normally performs the learning operation. However, when there are a plurality of internal noise sources, for example, when the video camera generates a noise of the rotary head and noise created when the lens is zoomed, the following problem occurs. In the case where the noise reference microphone 1005 is located in the vicinity of either one of the internal noise sources, the noise reference microphone 1005 cannot capture the internal noise from the other internal noise source or sources. Even when the noise reference microphone 1005 is located at an equal distance from the plurality of internal noise sources, there are a plurality of transfer characteristic s from the plurality of internal noise sources to the noise reference microphone 1005 and a plurality of transfer characteristics from the plurality of internal noise sources to the main microphone 1001. Accordingly, the effect of reducing the internal noise is difficult to obtain.

(5) When an external audio signal is captured by the noise reference microphone 1005, the audio signal is mixed into the output signal from the main microphone 1001 through the adaptive filter 1030 and the signal subtraction section 1040. As a result, an echo noise is generated, which adversely influences the sound quality.

SUMMARY OF THE INVENTION

In one aspect of the invention, a built-in microphone device for use in an apparatus having a mechanism section generating internal noise inside a housing of the apparatus includes a main microphone for picking up an external sound; a noise reference microphone for picking up the internal noise; an adaptive filter member for generating a control audio signal based on an output signal from the noise reference microphone using a filter coefficient; a signal subtraction section for subtracting the control audio signal generated by the adaptive filter member from an output signal from the main microphone to generate a subtraction result; and a filter coefficient update control section for receiving an operation signal generated at the time of an operation of the mechanism section, and in response to the operation signal, updating the filter coefficient of the adaptive filter member based on the subtraction result generated by the signal subtraction section and an output signal from the noise reference microphone.

In one embodiment of the invention, the built-in microphone device further includes comprising a comparison section for determining whether a ratio of a level of the output signal from the noise reference microphone with respect to a level of the output signal from the main microphone is higher than a prescribed threshold value or not. When the filter coefficient update control section receives the operation signal and the comparison section determines that the ratio of the level of the output signal from the noise reference microphone with respect to the level of the output signal from the main microphone is higher than the prescribed threshold value, the filter coefficient update control section updates the filter coefficient of the adaptive filter based on the subtraction result generated by the signal subtraction section and the output signal from the noise reference microphone.

In one embodiment of the invention, the built-in microphone device further includes a comparison section for determining whether a level of the output signal from the main microphone is lower than a prescribed threshold value or not. When the filter coefficient update control section receives the operation signal and the comparison section determines that the level of the output signal from the main microphone is lower than the prescribed threshold value, the filter coefficient update control section updates the filter coefficient of the adaptive filter based on the subtraction result generated by the signal subtraction section and the output signal from the noise reference microphone.

In one embodiment of the invention, the mechanism section is a head moving section of a disk recording apparatus.

In one embodiment of the invention, the mechanism section is a zoom section of a video camera.

In one embodiment of the invention, the mechanism section is an autofocus section of a video camera.

In one embodiment of the invention, the noise reference microphone is provided in the housing and in the vicinity of the main microphone.

In one embodiment of the invention, the built-in microphone device further includes a vibration noise reduction section for maintaining the main microphone and the noise reference microphone in a vibration-free state.

In one embodiment of the invention, the vibration noise reduction section includes a floating section for retaining the main microphone and the noise reference microphone, and a damper section for elastically supporting the floating auction to the housing. The main microphone is directed outward with respect to the floating section, and the noise reference microphone is directed inward with respect to the floating section.

In another aspect of the invention, a built-in microphone device for use in an apparatus having a mechanism section generating internal noise inside a housing of the apparatus includes a main microphone for picking up an external sound; a noise reference microphone for picking up the internal noise; an adaptive filter member for generating a control audio signal based on an output signal from the noise reference microphone using a filter coefficient; a signal subtraction section for subtracting the control audio signal generated by the adaptive filter member from an output signal from the main microphone to generate a subtraction result: and a filter coefficient update control section for, when the mechanism section is operated in a wait state of the built-in microphone device, updating the filter coefficient of the adaptive filter member based on the subtraction result generated by the signal subtraction section and an output signal from the noise reference microphone.

In one embodiment of the invention, the built-in microphone device further includes a comparison section for determining whether a ratio of a level of the output signal from the noise reference microphone with respect to a level of the output signal from the main microphone is higher than a prescribed threshold value or not. When the built-in microphone device is in a wait state and the comparison section determines that the ratio of the level of the output signal from the noise reference microphone with respect to the level of the output signal from the main microphone is higher than the prescribed threshold value, the mechanism section is operated and the filter coefficient update control section updates the filter coefficient of the adaptive filter based on the subtraction result generated by the signal subtraction section and the output signal from the noise reference microphone.

In one embodiment of the invention, the built-in microphone device further includes a comparison section for determining whether a level of the output signal from the main microphone is lower than a prescribed threshold value or not. When the built-in microphone device is in a wait state and the comparison section determines that the level of the output signal from the main microphone is lower than the prescribed threshold value, the mechanism section is operated and the filter coefficient update control section updates the filter coefficient of the adaptive filter based on the subtraction result generated by the signal subtraction section and the output signal from the noise reference microphone.

In still another aspect of the invention, the built-in microphone device for use in an apparatus having a mechanism section generating internal noise inside a housing of the apparatus includes first through n'th main microphones for picking up an external sound; a noise reference microphone for picking up the internal noise; adaptive filter member for generating a control audio signal based on an output signal from the noise reference microphone using a filter coefficient; first through n'th signal subtraction sections respectively for subtracting the control audio signal generated by the adaptive filter member from output signals from the first through n'th main microphones to generate subtraction results; a filter coefficient update control section updating the filter coefficient of the adaptive filter member based on a subtraction result generated by a k'th signal subtraction section and an output signal from the noise reference microphone, so as to reduce the subtraction result, where k is a value among 1 through n; and a directivity synthesis section for receiving the output signals from the first through n'th signal subtraction sections and synthesizing directivities of the first through n'th main microphones.

The first through n'th main microphones are provided in the vicinity of one another, and the noise reference microphone is provided in the vicinity of the first through n'th main microphones inside the housing.

In one embodiment of the invention, the built-in microphone device further includes a comparison section for comparing a level of the output signal from the k'th main microphone and a level of an output signal from the noise reference microphone to generate a comparison result. The filter coefficient update control section updates the filter coefficient based on the comparison result generated by the comparison section.

In yet another aspect of the invention, a built-in microphone device for use in an apparatus having a mechanism section generating internal noise inside a housing of the apparatus includes first through n'th plain microphones for picking up an external sound; a noise reference microphone for picking up the internal noise; an adaptive filter member for generating a control audio signal based on an output signal from the noise reference microphone using a filter coefficients first through n'th signal subtraction sections respectively for subtracting the control audio signal generated by the adaptive filter member from output signals from the first through n'th main microphones to generate subtraction results: an averaging section for calculating an average of the subtraction results generated by the first through n'th signal subtraction sections; a filter coefficient update control section updating the filter coefficient of the adaptive filter member based on the average calculated by the averaging section and an output signal from the noise reference microphone, so as to reduce the average; and a directivity synthesis section for receiving the output signals from the first through n'th signal subtraction sections and synthesizing directivities of the first through ft th main microphones. The first through n'th main microphones are provided in the vicinity of one another, and the noise reference microphone is provided in the vicinity of the first through n'th main microphones inside the housing.

In one embodiment of the invention, the built-in microphone device further includes a comparison section for comparing a level of the output signal from the k'th main microphone and a level of an output signal from the noise reference microphone to generate a comparison result. The filter coefficient update control section updates the filter coefficient based on the comparison result generated by the comparison section.

The present invention functions as follows.

The filter coefficient of the adaptive filter member is updated in response to an operating signal which is generated at the time of an operation of the mechanism section. Accordingly, only when the mechanism section generates internal noise, the filter coefficient of the adaptive filter member is updated and thus appropriately converged so as to cancel the internal noise.

In one embodiment of the invention, the filter coefficient of the adaptive filter member is updated based on the level ratio of an internal noise signal supplied by the noise reference microphone with respect to an output signal supplied by the main microphone or based on the level of the output signal supplied by the main microphone. Thus, the learning operation of the adaptive filter is stabilized.

In one embodiment of the invention, the main microphone and the noise reference microphone are located close to each other. In this manner, the interval between the timing when external sound is picked up by the main microphone and the timing, when external sound is picked up by the noise reference microphone is reduced, so that an echo component is reduced to an audibly negligible level.

In one embodiment of the invention, both the main microphone and the noise reference microphone are maintained in a vibration-free state. Thus, the vibration noise disturbing the learning operation of the adaptive filter member is suppressed and stabilize the learning operation.

When the microphone device is in a wait state (for example, after the power is turned on but before the recording of audio data is started), the mechanism section can be operated to generate internal noise, so that the filter coefficient of the adaptive filter member 1s estimated. Therefore, internal noise generated by a mechanism section operating intermittently can be suppressed from the start of the recording of the audio data.

The first through n'th main microphones and the noise reference microphone are located close to one another, so that the adaptive filter is processed commonly. Accordingly, stereo-type or multiple channel-type microphone devices can be provided without increasing the processing amount. In such a structure, the filter coefficient of the adaptive filter is updated based on the subtraction result from one signal subtraction section and the output signal from the noise reference microphone, or based on the average of the subtraction results from a plurality of signal subtraction sections and the output signal from the noise reference microphone. Accordingly, only the adaptive filter member is required, which simplifies the structure of the microphone device.

Thus, the invention described herein makes possible the advantages of providing a built-in microphone device for allowing a filter coefficient of an adaptive filter to perform a learning operation in a stable manner, so that the filter coefficient converges so as to cancel internal noire generated by an internal noise source in an apparatus in which the built-in microphone device is incorporated.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
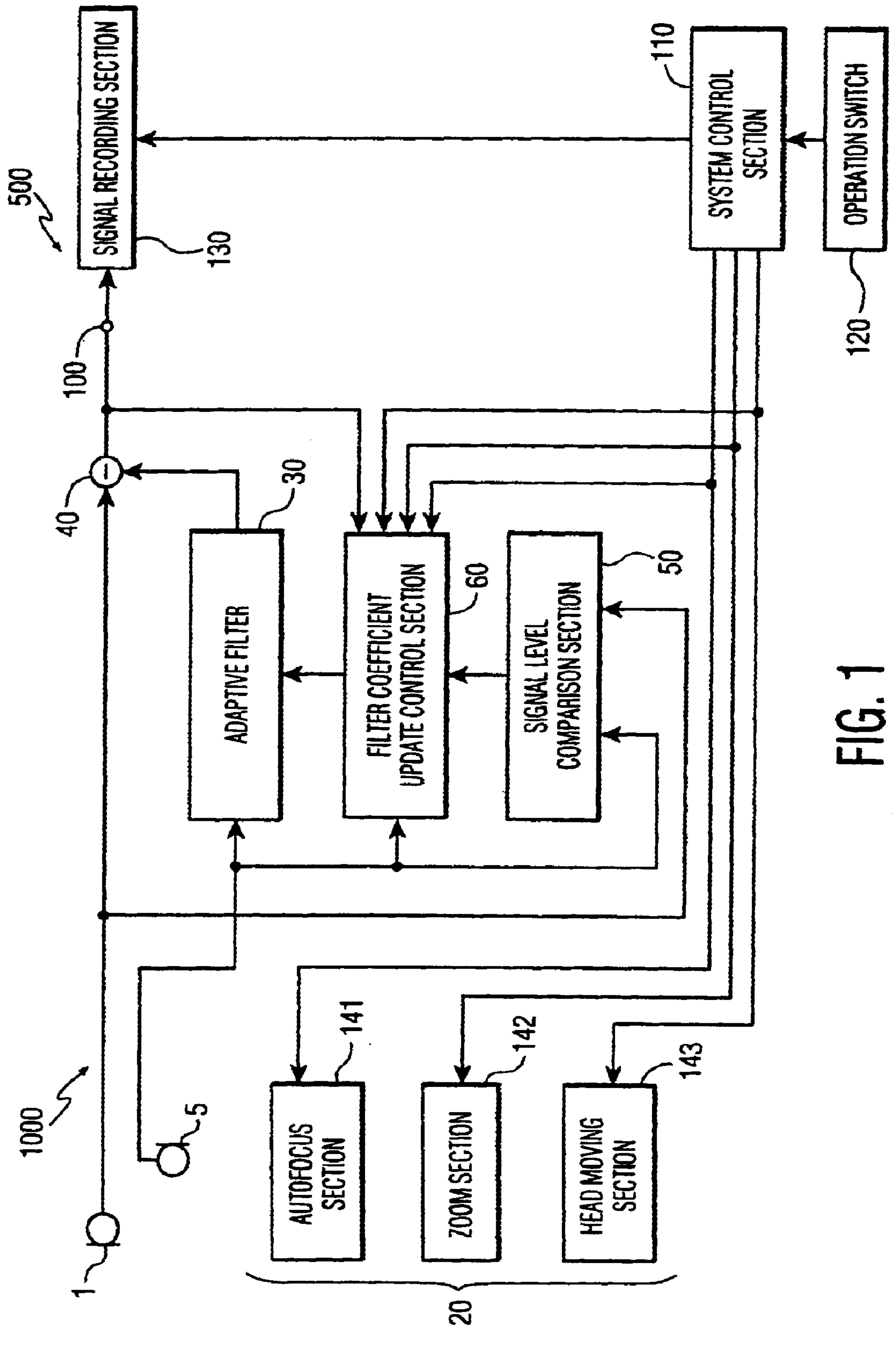
FIG. 1 is a block diagram of a built-in microphone device in a first example according to the present invention and an apparatus in which the built-in microphone device is incorporated.
Figure 2:
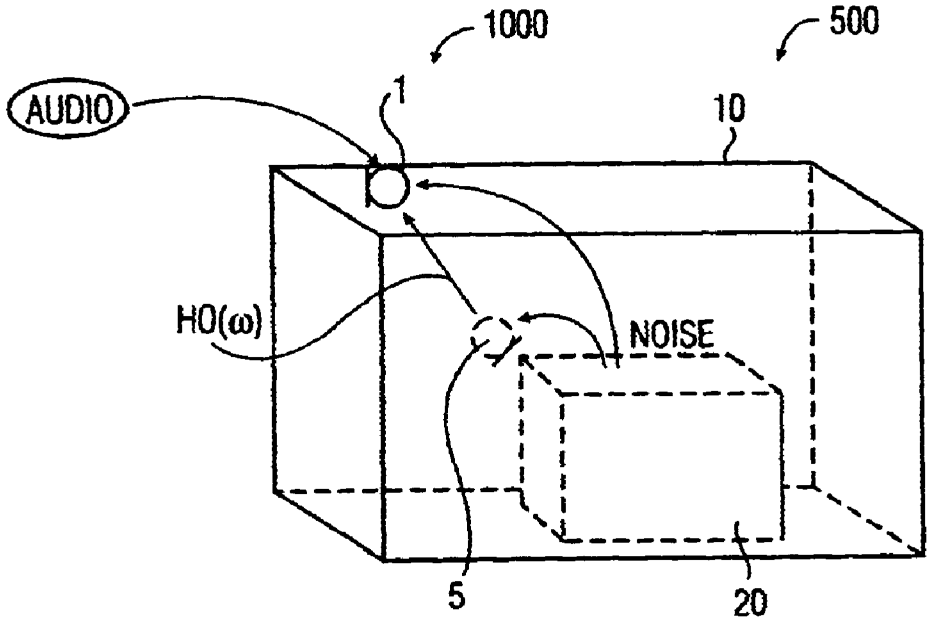
FIG. 2 is a schematic isometric view of the built-in microphone device and the apparatus shown in FIG. 1, illustrating the positional relationship between a main microphone and a noise reference microphone of the built-in microphone device.

A built-in microphone device 1000 in a first example according to the present invention will be described with reference to FIGS. 1 and 2. FIG. 1 is a block diagram of a built-in microphone device 1000 and an audio visual apparatus 500 in which the built-in microphone device 1000 is incorporated. FIG. 2 is a schematic isometric view of the built-in microphone device 1000 and the audio visual apparatus 500, illustrating the positional relationship between a main microphone 1 and a noise reference microphone 5 of the built-in microphone device 1000.

The audio visual apparatus 500 in this example is a video camera (hereinafter, referred to as the "video camera 500" for simplicity). The video camera 500 includes the built-in microphone device 1000 and a housing 10. The housing 10 accommodates a signal recording section 130 for recording an audio signal picked up by the microphone device 1000, a system control section 110 for comprehensively controlling the video camera 500, an autofocus section 141 for automatically adjusting the focus of an imaging lens (not shown) of the video camera 500, a zoom section 142 for changing the imaging magnification of the imaging lens, and a head moving section 143 for moving a recording and reproduction head (not shown) of a recording and reproduction apparatus for recording a video obtained by the video camera on a recording medium (e.g., a disk not shown).

The autofocus section 141, the zoom section 142 and the head moving section 143, which mainly generate internal noise, are comprehensively referred to as a mechanism section 20.

The video camera 500 operates in the following manner.

When an operation switch 120 is operated to instruct an increase or decrease in the imaging magnification, the system control section 110 supplies the zoom section 142 with a control signal for driving the zoom section 142. In response to the control signal, the zoom section 142 changes the imaging magnification of the imaging lens.

When the operation switch 120 is operated to instruct start of video recording, the system control section 110 supplies the head moving section 143 with a control signal for driving the head moving section 143. In response to the control signal, the head moving section 143 moves the recording and reproduction head to an appropriate position above the disk. Before starting the video recording, the system control section 110 also supplies the autofocus section 141 with a control signal for driving the autofocus section 141. In response to the control signal, the autofocus section 141 automatically adjusts the focus of the imaging lens.

When the operation switch 120 is operated to instruct pause of the video recording, the system control section 110 supplies a control signal with each of the autofocus section 141, the zoom section 142 and the head moving section 113 for a prescribed time period with no video recording being performed (e.g., with no video signal being sent to the recording and reproduction head above the disk). In response to the control signals, the autofocus section 141, the zoom section 142 and the head moving section 143 operate only in order to update the filter coefficient of an adaptive filter 30 of the built-in microphone device 1000 for a prescribed period as described below.

The control signals supplied by the system control section 110 to the autofocus section 141, the zoom section 142 and the head moving section 143 are also input to a filter coefficient update control section 60 of the built-in microphone device 1000.

Hereinafter, the structure of the built-in microphone device 1000 will be described with functions of elements thereof. FIG. 2 shows the positional relationship among the main microphone 1, the noise reference microphone 5, the housing 10 of the video camera 500 and the mechanism section 20. The main microphone 1, which is provided on an outer surface of a wall of the housing 10, has a high sensitivity mainly to a sound outside the video camera 500, which is to be pieced up. The noise reference microphone 5, which is provided inside the housing 10, has a high sensitivity to internal noise mainly generated by the mechanism section 20.

An internal noise signal generated by the noise reference microphone 5 is input to the adaptive filter 30, a signal level comparison section 30 and the filter coefficient update control section 60.

The adaptive filter 30 filters the internal noise signal sent by the noise reference microphone 5 using a filter coefficient which is updated by the filter coefficient update control section 60, and generates a control audio signal which is identical with an internal noise signal received by the main microphone 1.

A signal subtraction section 60 subtracts the control audio signal sent from the adaptive filter 30 from an output signal from the main microphone 1, and thus outputs an audio signal free of the internal noise.

The signal level comparison section 50 receives the output signal from the main microphone 1 and the internal noise signal from the noise reference microphone 5, and compares the two signals. The signal level comparison section 50 then outputs, as a comparison result, a difference value of the two signals or a level ratio Lc, i.e., ratio of the internal noise signal to the output signal from the main microphone 1.

The filter coefficient update control section 60 receives the comparison result generated by the signal level comparison section 50, the internal poise signal from the noise reference microphone 5, the audio signal from the signal subtraction section 10, and a control signal from the system control section 110 for driving the mechanism section 20. When the level ratio Lc exceeds a prescribed threshold value, the filter coefficient update control section 60 updates the filter coefficient of the adaptive filter 30 so as to minimize the amplitude of the internal noise signal at an output terminal 100.

An operation principle of the built-in microphone device 1000 having the above structure will be described.

Sound waves picked up by the main microphone 1 and the noise reference microphone 5 are converted into an electric signal. The sound waves received by main microphone 1 include voice or other sound around the video camera 500, which is to be picked up, and internal noise of, for example; a motor, rotary head and the head moving section 143 of the mechanism section 20. Since it is desirable that the main microphone 1 does not pick up the internal noise generated by the mechanism section 20, the mechanism section 20 is usually sealed in the housing 10. However, the housing 10 unavoidably has an opening with a lid and slits around switches and the like in order to allow insertion of batteries, video cassettes and disks. Furthermore, the recent trends of size reduction of the audio visual apparatuses inevitably shorten the distance between the main microphone 1 and the mechanism section 20. This tends to cause the internal noise from the mechanism section 20 to be picked up by the main microphone 1.

Under the circumstances, the adaptive filter 30 needs to estimate a signal which is identical with an internal noise signal picked up by the main microphone 1 using the internal noise signal supplied by the noise reference microphone 5. The filter coefficient of the adaptive filter 30, h(n), can be obtained by a convergence-type adaptive algorithm (LMS algorithm or the like). 8y the convergence-type adaptive algorithm, the filter coefficient h(n) is updated each time an audio signal e(n) from the signal subtraction section 40 after the internal noise is cancelled, and an internal noise signal u(n) from the noise reference microphone 5 are sampled. The transfer characteristic of the adaptive filter 30 is converged to a transfer characteristic H0(ω) from the noise reference microphone 5 to the main microphone 1.

The filter coefficient update control section 60 updates the filter coefficient h(n), which is a vector, so that the transfer characteristic (H(ω)) of the adaptive filter 30 is converged to the transfer characteristic H0(ω) from the noise reference microphone 5 to the main microphone 1. Accordingly, the filter coefficient h(n) can be updated by expressions (1) through (3) using the internal noise signal u(n) as an output vector from the noise reference microphone 5, the audio signal e(n) from the signal subtraction section 40, the output signal Lc from the signal level comparison section 50, and the control signal for driving the mechanism section 20. Such signal processing is referred to as the LMS algorithm.

$$h(n+1)=h(n)+(\alpha/\|u(n)\|^2)u(n)e(n)\ \ldots \qquad \text{expression (1)}$$

$$e(n)=d(n)-u^2(n)h(n)\ \ldots \qquad \text{expression (2)}$$

$$\|u(n)\|^2\ \ldots\ \text{expression (3)}$$

In expressions (1), (2) and (3), the step gain a in expression (1) is a positive constant u(n) represents an internal noise signal from the noise reference microphone 5, i.e., an input vector to a tap of the adaptive filter 30, at time n. h(n) represents a vector of the filter coefficient h(n). e(n) represents an audio signal from the signal subtraction section 40. d(n) in expression (2) represents an output signal from the main microphone 1. Expression (3) represents a square norm of u(n). The output signal Lc from the signal level comparison section 50 and the control signal for driving the mechanism section 20 are used as parameters for updating the filter coefficient h (n) in the filter coefficient update control section 60. The filter coefficient update control section 60 converges the transfer characteristic H(ω) of the adaptive filter 30 so as to be equal to the transfer characteristic H0(ω) from the noise reference microphone 5 to the main microphone 1.

The transfer characteristic H(ω) of the adaptive filter 30 is updated by the filter coefficient update control section 60 so that H0(ω)=H(ω). In order to estimate the transfer characteristic H0(ω) of the internal noise generated by the mechanism section 20 from the noise reference microphone 5 to the main microphone 1, it is most convenient to update the filter coefficient h(n) while the internal noise is generated only by the mechanism section 20. By contrast, when there is a voice or other sound signal around the video camera 500 to be picked up by the main microphone 1, such a signal disturbs the learning operation of the adaptive filter 30. In such a case, the update needs to be slowed or stopped by the filter coefficient update control section 60. Otherwise, the filter coefficient h(n) diverges and thus cannot cancel the internal noise.

When a voice or other sound signal which disturbs the convergence of the filter coefficient h(n) of the adaptive filter 30 is increased to an excessive level, the filter coefficient update control section 60 controls the step gain α in expression (1) in accordance with Table 1, so as to realize α=0 and thus to stop the updating operation of the filter coefficient h(n), or so as to realize α<<1 and thus to reduce the updating speed of the filter coefficient h(n). In this manner, the diversion of the filter coefficient h(n) is avoided.

TABLE 1

| | | Control signal for driving mechanical section 20 | |
|---|---|---|---|
| | | With driving | Without driving |
| Lc (from signal level comparison section 50 | 6 dB or less | α = 0 | α = 0 |
| | 6–20 dB | α = 0 to 0.1 | α = 0 |
| | 20 dB or more | α = 0.1 | α = 0 |

The level ratio Lc in Table 1 is an output signal from the signal level comparison section 60 and is calculated by expression (4).

$Lc$=20·$\log_{10}$ (short-time average of amplitude of output signal from noise reference microphone 5/short-time average of amplitude of output signal from main microphone 1) expression (4)

The value of the step gain a is determined by the ratio Lc of the level of the output signal from the noise reference microphone 5 with respect to the level of the output signal from the main microphone 1.

The autofocus section 141, the zoom section 142 and the head moving section 143 included in the mechanism section 20 operate intermittently. Therefore, the updating operation of the filter coefficient h(n) of the adaptive filter 30 needs to be stopped when the sections 141, 142 and 143 are not operated. Accordingly, the filter coefficient update control section 60 controls the updating operation of the filter coefficient h(n) of the adaptive filter 30 also using the control signal for driving the mechanism section 20. When the operation switch 120 is operated to instruct an increase or decrease in the imaging magnification or the start of video recording, or cause the mechanism section 20 to operate for a certain time period only in order to update the filter coefficient with no video recording being performed, a control signal is output from the system control section 110, as described above. When the control signal is not output from the system control section 110, the filter coefficient update control section 60 sets the step gain to be α=0 and thus pauses the updating operation of the filter coefficient h(n).

In other words, the filter coefficient update control section 60 sets the step gain to be α=0 and thus pauses the updating of the filter coefficient h (n) when the mechanism section 20 is not driven. As Lc is increased (i.e., the level of the internal noise signal from the noise reference microphone 5 is increased, or the level of the output signal from the main microphone 1 is decreased), the filter coefficient update control section 60 gradually increases the step gain a and thus accelerates the updating operation of the filter coefficient h(n).

When α=0, the operation of the filter coefficient update control section 60 can be stopped in order to reduce the amount of calculations.

In order to obtain the effect of reducing the internal noise simultaneously with the start of sound recording, the learning operation of the adaptive filter 30 needs to be completed before the start of sound recording. In order to realize this, the mechanism section 20 can be intentionally operated after the power is turned on but before the recording is started, so that the adaptive filter 30 performs the learning operation. The energy can be saved by operating the mechanism section 20 only when the level of a voice or other sound signal around the video camera 500 is excessively low.

Although Table 1 indicates 0≦α≦0.1, the LMS algorithm theoretically allows 0≦α≦2.

EXAMPLE 2

Figure 3:
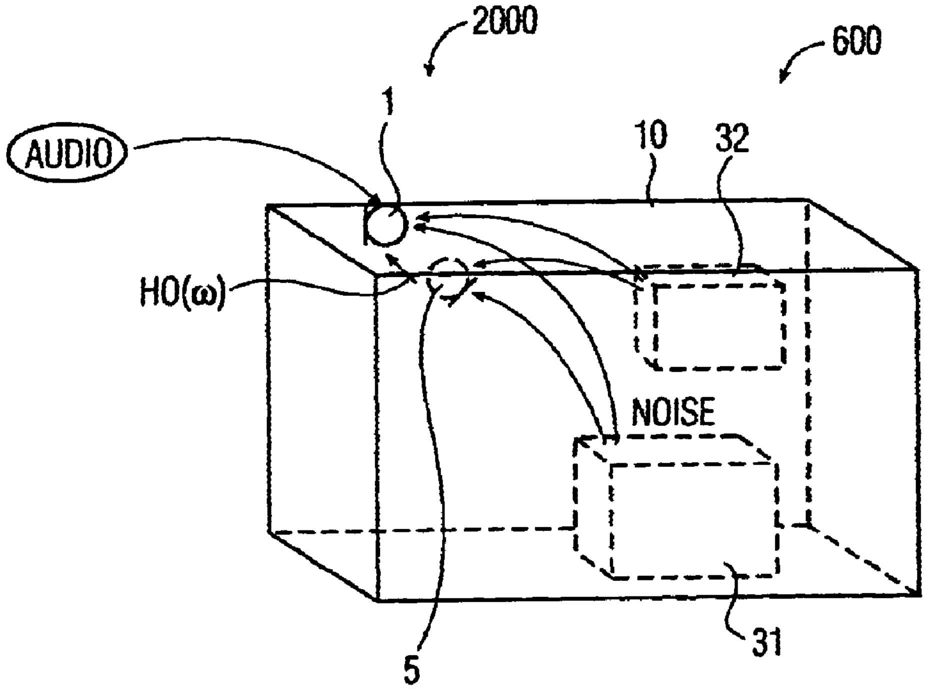
FIG. 3 is a schematic isometric view of a built-in microphone device in a second example according to the present invention and an apparatus in which the built-in microphone device is incorporated, illustrating the positional relationship between a main microphone and a noise reference microphone of the built-in microphone device.

A built-in microphone device 2000 in a second example according to the present invention will be described with reference to FIG. 3. Identical elements previously discussed with respect to FIGS. 1 and 2 bear identical reference numerals and the descriptions thereof will be omitted. FIG. 3 is a schematic isometric view of a built-in microphone device 2000 and an audio visual apparatus 600 in which the built-in microphone device 2000 is incorporated. FIG. 3 illustrates the positional relationship between a main microphone 1 and a noise reference microphone 5 of the built-in microphone device 2000. In this example, the audio visual apparatus 600 is, for example, a video camera (referred to as the "video camera 600 for simplicity).

The video camera 600 has a housing 10. The housing 10 accommodates a first mechanism section 31 and a second mechanism section 32. The circuit diagram for generating control signals is similar to that shown in FIG. 1. Since the video camera 600 has two mechanism sections 31 and 32, the noise reference microphone 5 is closer to the main microphone 1 than in the first example.

An operation principle of the built-in microphone device 2000 having such a structure will be described.

For canceling internal noise, the noise reference microphone 5 is generally provided in the vicinity of the source of the internal noise as shown in FIG. 2. In the case where there are a plurality of internal noise sources in the housing 10, the noise reference microphone 5 provided in the vicinity of one of the plurality of internal noise sources, for example, in the vicinity of the first mechanism section 31 as shown in FIG. 3 cannot cancel the internal noise generated by the second mechanism section 32.

A structure including the noise reference microphone 5 in the vicinity of each of the noise sources in order to cancel the internal noise from the plurality of sources requires a plurality of noise reference microphones and a plurality of adaptive filters. In order to avoid such a complicated structure, the noise reference microphone 5 is provided in the vicinity of the main microphone 1. Due to such an arrangement, the transfer characteristic of the internal noise generated by the first mechanism section 31 from the noise reference microphone 5 to the main microphone 1, and the transfer characteristic of the internal noise generated by the second mechanism section 32 from the noise reference microphone 5 to the main microphone 1, become proximate to each other. Accordingly, internal noise from the two or more mechanism sections can be suppressed by one noise reference microphone 5 and one adaptive filter 30.

Due to such a structure, internal noise from a plurality of sources, for example, the noise generated by the rotary head of the video camera (referred to as a "head touch noise") and the noise generated by the optical system at the time of zooming or autofocusing can be cancelled.

When the noise reference microphone 5 is provided in the vicinity of the main microphone 1 as in the second example, an external sound signal, even when picked up by the noise reference microphone 5, is not audibly sensed as an echo component since the interval between the timing when a sound signal is picked up by the main microphone 1 and the timing when a sound signal is picked up by the noise reference microphone 5 is shortened.

In this example, the housing 10 is provided with a sealing member (not shown) for preventing the internal noise generated by the mechanism section (mechanism sections 31 and 32 in the second example) from being transferred to the main microphone i. Such a member also substantially prevents an external sound signal from being picked up by the noise reference microphone 5.

Due to the short distance between the main microphone 1 and the noise reference microphone 3, and the sealing member, the level of an echo component is reduced sufficiently and thus is not audibly sensed due to the masking effect. Thus, the generation of an echo noise by the sound signal picked up by the noise reference microphone 5 is avoided.

The distance between the main microphone 1 and the noise reference microphone 5 in this example is appropriately several millimeters to several centimeters, for example, 5 mm to 20 mm in consideration of the frequency band and the size of the currently used microphones, the thickness of the housing material, and the space given to the sound pick-up section of the audio visual apparatuses.

EXAMPLE 3

Figure 4:
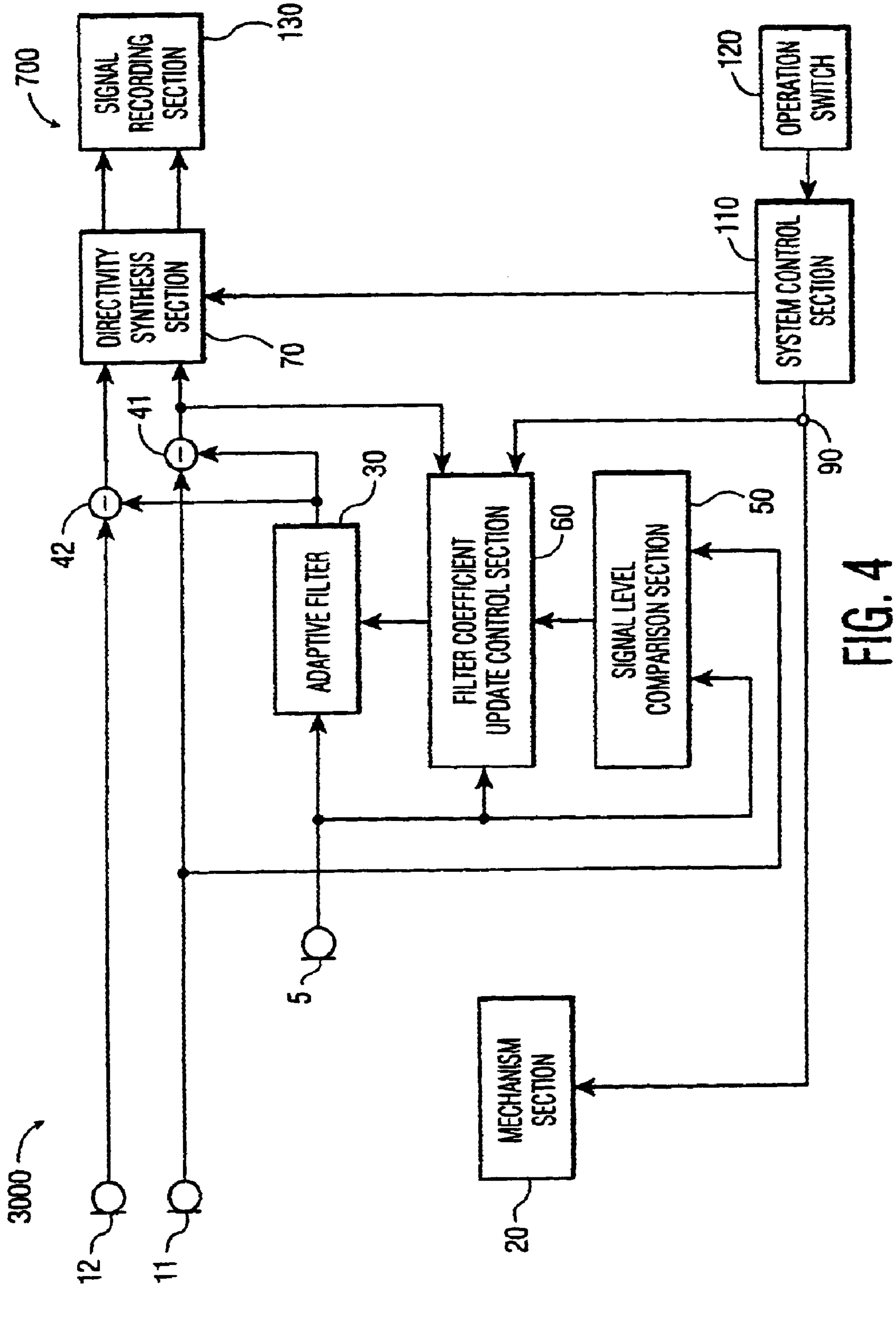
FIG. 4 is a block diagram of a built-in microphone device in a third example according to the present invention and an apparatus in which the built-in microphone device is incorporated.

A built-in microphone device 3000 in a third example according to the present invention will be described with reference to FIGS. 4 and 5. FIG. 4 is a block diagram of a built-in microphone device 3000 and an audio visual apparatus 700 in which the built-in microphone device 3000 is incorporated.

The built-in microphone device 3000 is of a similar type to the built-in microphone device 1000 in the first example, but is of a stereo-type. Identical elements previously discussed with respect to FIGS. 1 and 2 bear identical reference numerals and the descriptions thereof will be omitted. The built-in microphone device 3000, although being of a stereo type, provides an effect of suppressing internal noise without providing additional adaptive filter or filters.

An exemplary structure of the built-in microphone device 3000 will be described with functions of elements thereof.

The built-in microphone device 3000 includes a first main microphone 11 and a second microphone 12 provided on a wall of the housing so as to pick up an external sound. A noise reference microphone 5 is provided so as to pick up internal noise of the housing. An output signal from the first main microphone 11 is supplied to a signal level comparison section 50 and a first signal subtraction section 41. An output signal from the second main microphone 12 is supplied to a second signal subtraction section 42. The first signal subtraction section 41 subtracts an output supplied by an adaptive filter 30 from the output signal supplied by the first main microphone 11, and outputs a first audio signal free of the internal noise. The second signal subtraction section 42 subtracts the output signal supplied by the adaptive filter 30 from the output signal supplied by the second main microphone 12, and outputs a second audio signal free of the internal noise.

A directivity synthesis section 70 receives the output signals from the first signal subtraction section 41 and the second signal subtraction section 42, and generates an audio signal having a directivity. FIG. 5 is a block diagram illustrating an exemplary structure of the directivity synthesis section 70. A first signal delay section 71 delays the audio signal from the first signal subtraction section 41 and supplies the resultant signal to a fourth signal subtraction section 74. A second signal delay section 72 delays the audio signal from the second signal subtraction section 42 and supplies the resultant signal to a third signal subtraction section 73. The third signal subtraction section 73 subtracts the output signal supplied by the second signal delay section 72 from the audio signal supplied by the first signal subtraction section 41, and supplies the resultant signal to a first amplitude-frequency characteristic correction section 75. The fourth signal subtraction section 74 subtracts the output signal supplied by the first signal delay section 71 from the audio signal supplied by the second signal subtraction section 43 and supplies the resultant signal to a second amplitude-frequency characteristic correction section 76.

The first amplitude-frequency characteristic correction section 75 corrects the amplitude-frequency characteristic of the audio signal from the third signal subtraction section 73 and outputs the resultant audio signal through an output terminal 101. The signal from the output terminal. 101 has a directivity characteristic that has a high sensitivity on the first main microphone 11 side (i.e.; that favors the first main microphone 11 side). The second amplitude-frequency characteristic correction section 76 corrects the amplitude-frequency characteristic of the audio signal from the fourth signal subtraction section 74 and outputs the resultant audio signal through an output terminal 102. The signal from the output terminal 102 has a directivity characteristic that has a high sensitivity on the second main microphone 12 side (i.e., that favors the second main microphone 12 side).

The built-in microphone device 3000 having the above-described structure operates in the following manner. In this example, the audio visual apparatus 700 in which the built-in microphone device 3000 is incorporated is, for example, a compact video camera. A one-point stereo microphone built in a usual video camera provides a directivity by processing output signals from two or three non-directional microphone units by a directivity synthesis section. In this example, the first and second main microphones 11 and 12 act as such microphone units. The distance between the first and second main microphones 11 and 12 is about 5 mm to about 20 mm in consideration of the frequency band after the directivities of the main microphones 11 and 12 are synthesized and the location of the main microphones 11 and 12. In this case, the acoustic transfer characteristic from the noise reference microphone 5 to the first main microphone 11 is substantially equal to the acoustic transfer characteristic from the noise reference microphone 5 to the second main microphone 12.

With such a structure, as shown in FIG. 4, the output, signal from the first main microphone 11 and the internal noise signal from the noise reference microphone 5 are used to update the filter coefficient of the adaptive filter 30. Accordingly, the control audio signal from the adaptive filter 30 cancels a noise component of the output signal from the first main microphone 11 and also a noise component of the output signal from the second main microphone 12.

Figure 5:
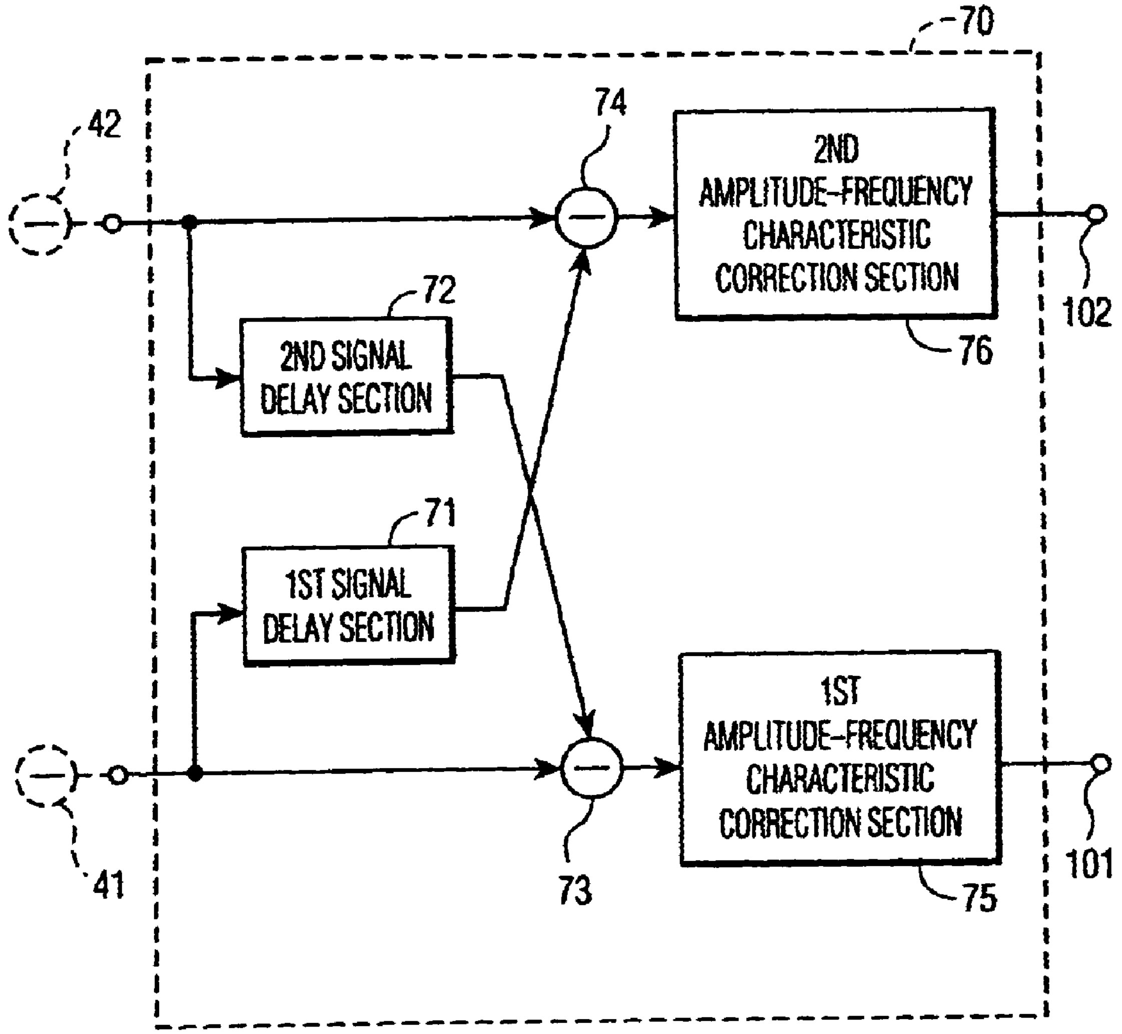
FIG. 5 is a block diagram of a directivity synthesis section of the built-in microphone device shown in FIG. 4.

The directivity synthesis section 70 shown in FIG. 5 performs first-order pressure-gradient-type directivity synthesis. Where the distance between the first and second microphones 11 and 12 is d, the sonic speed is c, and the signal delay amount by the first and second signal delay sections 71 and 72 is $\tau$=d/c, c, the output signal from the third signal subtraction section 73 and the output signal from the fourth signal subtraction section 74 both show a singular directivity characteristic having a main lobe which links the first and second main microphones 11 and 12. The directivity of the output signal from the third signal subtraction section 73 is from the second main microphone 12 toward the first main microphone 11 on the main lobe. The directivity of the output signal from the fourth signal subtraction section 76 is from the first main microphone 11 toward the second main microphone 12 on the main lobe.

The amplitude-frequency characteristics of the output signals from the third and fourth signal subtraction sections 73 and 74 which reduces as the frequency decreases at the slope of 6 dB/oct. The first and second amplitude-frequency characteristic correction sections 75 and 76 correct such characteristics so as to be flat.

In this manner, stereo-type or multiple channel-type built-in microphone devices having the functions of the built-in microphone devices 1000 or 2000 in the first or second example are provided.

EXAMPLE 4

Figure 6:
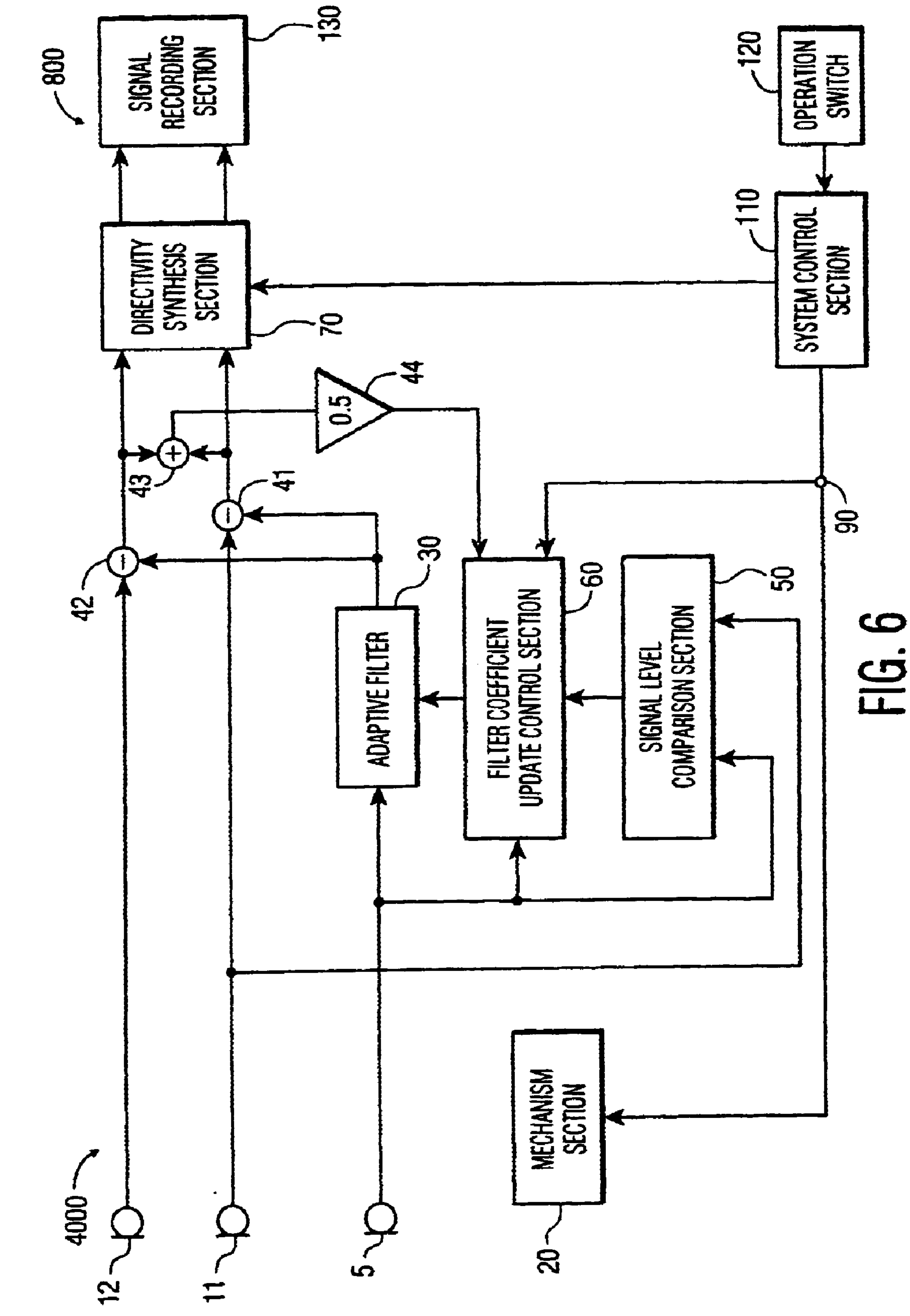
FIG. 6 is a block diagram of a built-in microphone device in a fourth example according to the present invention and an apparatus in which the built-in microphone device is incorporated.

A built-in microphone device 4000 in a fourth example according to the present invention will be described with reference to FIG. 6. FIG. 6 is a block diagram of the built-in microphone device 4000 and an audio visual apparatus 800 in which the built-in microphone device 4000 is incorporated.

Like the built-in microphone device 3000 in the third example, the built-in microphone device 4000 includes a first main microphone ii, a second main microphone 12, a noise reference microphone 5, an adaptive filter 30, a signal level comparison section 50, a filter coefficient update control section 60, a first signal subtraction section 41, a second signal subtraction section 42, and a directivity synthesis section 70.

Unlike the built-in microphone device 3000, the built-in microphone device 4000 includes a signal addition section 43 and a signal amplification section 44. The signal addition section 43 adds an output signal from the first signal subtraction section 41 and an output from the second signal subtraction section 42, and generates an addition signal. The signal amplification section 44 outputs a signal having an amplitude 0.5 times the addition signal (i.e., outputs a signal having an average amplitude of the outputs from the first and second signal subtraction sections 41 and 42). The filter coefficient update control section 60 receives an output signal from the noise reference microphone 5, the output signal from the signal amplification section 44, an output signal from the signal level comparison section 50, and a control signal for driving a mechanism section 20; and updates the filter coefficient of the adaptive filter 30.

The built-in microphone 4000 having the above-described structure operates in the following manner.

In the third example, the filter coefficient update control section 60 updates the filter coefficient using the output signal from the first signal subtraction section 41. In such an operation, the effect of canceling a noise component of the output signal from the f first main microphone 11 is optimally obtained, but the effect of canceling a noise component of the output signal from the second main microphone 12 tends to be slightly deteriorated. In the fourth example, an average signal of the output signal from the first signal subtraction section 41 and the output signal from the second signal subtraction section 52 is output from the signal amplification section 55 and is sent to the filter coefficient update control section 60. Due to such an operation, the effect of suppressing a noise component of the output from the first main microphone 11 can be equal to the effect of suppressing a noise component of the output from the second main microphone 12. Thus, the overall effect of suppressing a noise component is further, improved compared to the built-in microphone device 3000 in the third example.

Although the built-in microphone device 5000 includes two main microphones, first through n'th microphones can be provided in order to pick up a sound outside the housing (not shown) of the audio visual apparatus 600. In such a structure, an i'th (i=1 through n) signal subtraction section subtracts a control audio signal supplied by the adaptive filter 30 from an output signal supplied by an i'th main microphone. The signal level comparison section 50 compares the level of an output signal supplied by a k'th (k is a specified value among 1 through n) main microphone and the level of an internal noise signal supplied by the noise reference microphone 5, and generates a comparison result. The filter coefficient update control section 60 receives the comparison result generated by the signal level comparison section 50, the subtraction result of a k'th signal subtraction section, and the internal noise signal from the noise reference microphone 5; and updates the filter coefficient of the adaptive filter 30 so as to minimize the subtraction result of the k'th signal subtraction section.

In the first through third examples, the filter coefficient is updated with reference to the ratio of the internal noise level with respect to the output signal level from the main microphone. Instead, the filter coefficient of the adaptive filter 30 can be updated when the output signal level from the main microphone is lower than a prescribed threshold value and the mechanism section 20 is driven.

EXAMPLE 5

Figure 7:
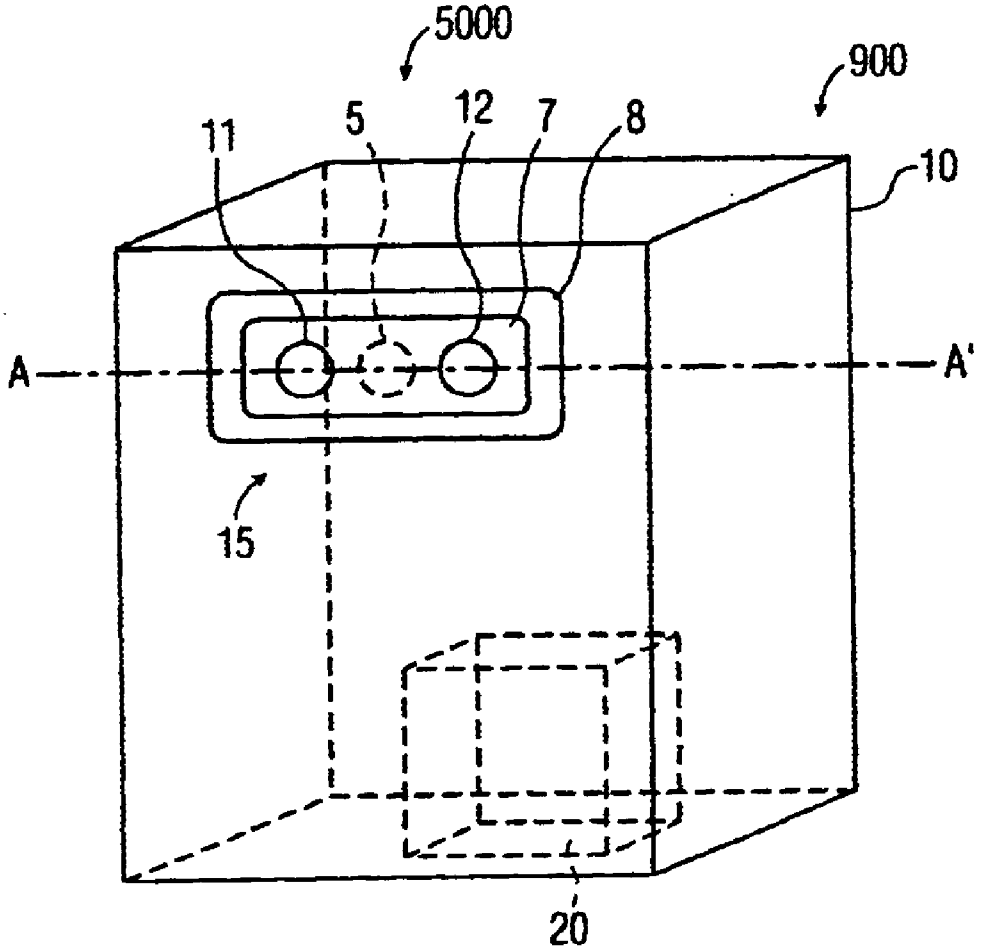
FIG. 7 is a schematic isometric view of a built-in microphone device in a fifth example according to the present invention and an apparatus in which the built-in microphone device is incorporated, illustrating a manner in which a microphone unit attachment board of the built-in microphone device is attached to a housing of the apparatus.
Figure 8:
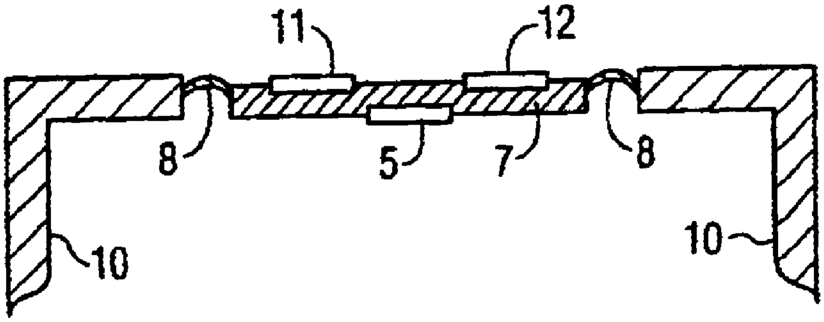
FIG. 8 is a cross-sectional view of FIG. 7 taken along lines A-A' in FIG. 7.
Figure 9:
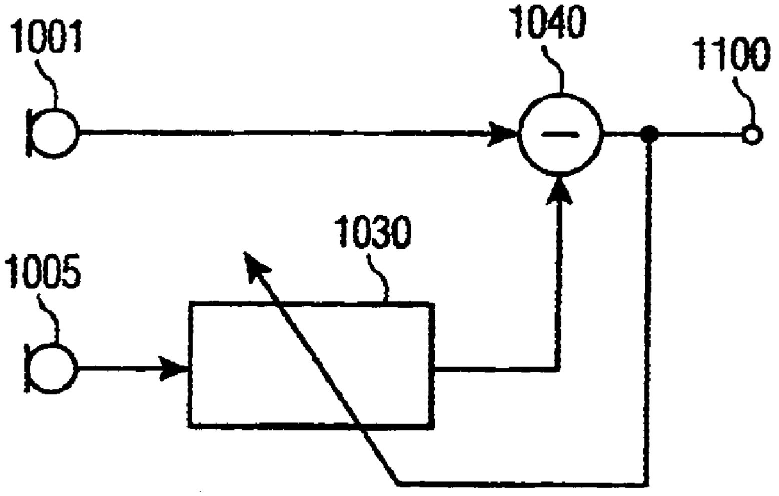
FIG. 9 is a block diagram of a conventional built-in microphone device.
Figure 10:
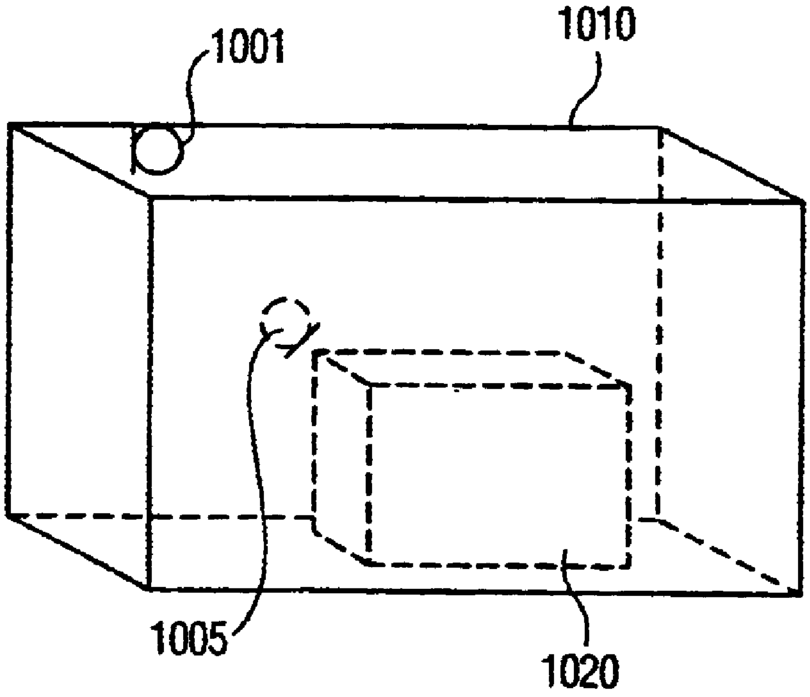
FIG. 10 is a schematic isometric view of the conventional built-in microphone device shown in FIG. 9 and an apparatus in which the built-in microphone device is incorporated, illustrating the positional relationship between a main microphone and a noise reference microphone of the built-in microphone device.

A built-in microphone device 5000 in a fifth example according to the present invention will be described with reference to FIGS. 7 and 8. FIG. 7 is a schematic isometric view of the built-in microphone device 5000 and an audio visual apparatus 900 in which the built-in microphone device 5000 is incorporated. FIG. 8 is a cross-sectional view of FIG. 7 taken along line A-A'.

As shown in FIGS. 7 and 8, the built-in microphone device 5000 includes a microphone unit attachment board 7 acting as a floating section, a first main microphone 11, a second main microphone 12, and a noise reference microphone 5. The microphone unit attachment board 7 is provided in a wall of a housing 10 of the audio visual apparatus 400.

The first main microphone 11 and the second main microphone 12 are directed outward with respect to the microphone unit attachment board 7 for mainly picking up an external sound, and the noise reference microphone 5 is directed inward with respect to the microphone unit attachment board 7 for mainly picking up internal noise. The microphone unit attachment board 7 is maintained in a vibration-free state with respect to the housing 10 by the damper 8, so as to act as a vibration noise reduction section for suppressing transfer of vibration of the mechanism section 20 to the microphones 11, 12 and 5. The damper 8 acts to elastically support the microphone unit attachment board 7 to the housing 10. The microphone unit attachment board 7 and the damper i can be integrally formed of an elastic material such as rubber.

The first and second main microphones 11 and 12 are located in the vicinity of the noise reference microphone 5. Such an arrangement provides a similar effect to that of the second example. The vibration noise of a plurality of microphone units can be suppressed by a single floating section. In addition to such an arrangement, the first and second main microphones 11 and 12 are close to each other and directed outward. Accordingly, the structure of the fifth example is also applicable to the third and fourth examples.

The adaptive filter 30 performs a learning operation for suppressing internal noise. The vibration oriented noise disturbs the learning operation. In order to avoid such a situation, in this example, the first and second main microphones 11 and 12 and the noise reference microphone 5 are maintained in a floating state with respect to the housing 10. Accordingly, even when a physical touch on or an operation of the audio visual apparatus 900 generates a noise or when a collision of the audio visual apparatus 900 against something generates vibration noise, the adaptive filter 30 can perform stable learning operation.

The present invention has the following effects.

The filter coefficient of the adaptive filter member is updated in response to an operating signal which is generated at the time of an operation of the mechanism section. Accordingly, only when the mechanism section generates internal noise, the filter coefficient of the adaptive filter member is updated and thus appropriately converged so as to cancel the internal noise.

In one embodiment of the invention, the filter coefficient of the adaptive filter member is updated based on the level ratio of an internal noise signal supplied by the noise reference microphone with respect to an output signal supplied by the main microphone or based on the level of the output signal supplied by the main microphone. Thus, the learning operation of the adaptive filter is stabilized.

In one embodiment of the invention, the main microphone and the noise reference microphone are located close to each other. In this manner, the interval between the timing when external sound is picked up by the main microphone and the timing when external sound is picked up by the noise reference microphone is reduced, so that an echo component is reduced to an audibly negligible level.

In one embodiment of the invention, both the main microphone and the noise reference microphone are maintained in a vibration-free state. Thus, the vibration noise disturbing the learning operation of the adaptive filter member is suppressed and stabilize the learning operation.

When the microphone device is in a wait state (for example, after the power is turned on but before the recording of audio data is started), the mechanism section can be operated to generate internal noise, so that the filter coefficient of the adaptive filter member is estimated. Therefore, internal noise generated by a mechanism section operating intermittently can be suppressed from the start of the recording of the audio data.

The first through n'th main microphones and the noise reference microphone are located close to one another, so that the adaptive filter is processed commonly. Accordingly, stereo-type or multiple channel-type microphone devices can be provided without increasing the processing amount. In such a structure, the filter coefficient of the adaptive filter is updated based on the subtraction result from one signal subtraction section and the output signal from the noise reference microphone, or based on the average of the subtraction results from a plurality of signal subtraction sections and the output signal from the noise reference microphone. Accordingly, only the adaptive filter member is required, which simplifies the structure of the microphone device.

Various other modifications will be apparent to and can be readily made by these skilled in the art without departing from the scope and spirit of this invention. Accordingly, it is not intended that the scope of the claims appended hereto be limited to the description as set forth herein, but rather that the claims be broadly construed.

What is claimed is:

1. A built-in microphone device for use in an apparatus having a mechanism section generating internal noise inside a housing of the apparatus, the built-in microphone device comprising:

a main microphone for picking up an external sound;

a noise reference microphone for picking up the internal noise;

an adaptive filter member for generating a control audio signal based on an output signal from the noise reference microphone using a filter coefficient;

a signal subtraction section for subtracting the control audio signal generated by the adaptive filter member from an output signal from the main microphone to generate a subtraction result; and a filter coefficient update control section for updating the filter coefficient of the adaptive filter member by receiving an operation signal which is input to the mechanism section for causing the mechanism section to operate, the subtraction result generated by the signal subtraction section and an output signal from the noise reference microphone, wherein when a ratio of the output signal level of the noise reference microphone to the output signal level of the main microphone decreases, the filter coefficient update control section decelerates the updating of the filter coefficient, and when a ratio of the output signal level of the noise reference microphone to the output signal level of the main microphone increases, the filter coefficient update control section accelerates the updating of the filter coefficient; and when the built-in microphone device is in a wait state of recording and the output signal level from the main microphone is excessively low, the mechanism section is operated to generate noise, and said filter coefficient update section updates the filter coefficient of the adaptive filter member by receiving (1) an operations signal which is input to the mechanism section for causing said mechanism section to operate, (2) the subtraction result generated by the subtraction section and (3) an output signal from the noise reference microphone.

2. A built-in microphone device according to claim 1, further comprising a comparison section for determining whether the ratio of the output signal levels from the noise reference and main microphones is higher than a prescribed threshold value or not, wherein, when the filter coefficient update control section receives the operation signal and the comparison section determines that the ratio of the output signal levels from the noise reference and main microphones is higher than the prescribed threshold value, the filter coefficient update control section updates the filter coefficient of the adaptive filter based on the subtraction result generated by the signal subtraction section and the output signal from the noise reference microphone.

3. A built-in microphone device according to claim 1, further comprising a comparison section for determining whether a level of the output signal from the main microphone is lower than a prescribed threshold value or not, wherein, when the filter coefficient update control section receives the operation signal and the comparison section determines that the level of the output signal from the main microphone is lower than the prescribed threshold value, the filter coefficient update control section updates the filter coefficient of the adaptive filter based on the subtraction result generated by the signal subtraction section and the output signal from the noise reference microphone.

4. A built-in microphone device according to claim 1, wherein the mechanism section is a head moving section of a disk recording apparatus.

5. A built-in microphone device according to claim 1, wherein the mechanism section is a zoom section of a video camera.

6. A built-in microphone device according to claim 1, wherein the mechanism section is an autofocus section of a video camera.

7. A built-in microphone device according to claim 1, wherein the noise reference microphone is provided in the housing and in the vicinity of the main microphone.

8. A built-in microphone device according to claim 1, further comprising a vibration noise reduction section for maintaining the main microphone and the noise reference microphone in a vibration-free state.

9. A built-in microphone device according to claim 8, wherein the vibration noise reduction section includes:

a floating section for retaining the main microphone and the noise reference microphone, and a damper section for elastically supporting the floating section to the housing, wherein the main microphone is directed outward with respect to the floating section, and the noise reference microphone is directed inward with respect to the floating section.

10. A built-in microphone device for use in an apparatus having a mechanism section generating internal noise inside a housing of the apparatus, the built-in microphone device comprising:

a main microphone for picking up an external sound;

a noise reference microphone for picking up the internal noise;

an adaptive filter member for generating a control audio signal based on an output signal from the noise reference microphone using a filter coefficient;

a signal subtraction section for subtracting the control audio signal generated by the adaptive filter member from an output signal from the main microphone to generate a subtraction result; and a filter coefficient update control section for, when the mechanism section is operated in a wait state of the built-in microphone device and when the output signal level from the main microphone is excessively low, updating the filter coefficient of the adaptive filter member by receiving (1) an operation signal which is input to the mechanism section for causing the mechanism section to operate, (2) the subtraction result generated by the signal subtraction section, and (3) an output signal from the noise reference microphone.

11. A built-in microphone device according to claim 10, further comprising a comparison section for determining whether a ratio of a level of the output signal from the noise reference microphone with respect to a level of the output signal from the main microphone is higher than a prescribed threshold value or not, wherein, when the built-in microphone device is in a wait state and the comparison section determines that the ratio of the level of the output signal from the noise reference microphone with respect to the level of the output signal from the main microphone is higher than the prescribed threshold value, the mechanism section is operated and the filter coefficient update control section updates the filter coefficient of the adaptive filter based an the subtraction result generated by the signal subtraction section and the output signal from the noise reference microphone.

12. A built-in microphone device according to claim 10, further comprising a comparison section for determining whether a level of the output signal from the main microphone is lower than a prescribed threshold value or not, wherein, when the built-in microphone device is in a wait state and the comparison section determines that the level of the output signal from the main microphone is lower than the prescribed threshold value, the mechanism section is operated and the filter coefficient update control section updates the filter coefficient of the adaptive filter based on the subtraction result generated by the signal subtraction section and the output signal from the noise reference microphone.

* * * * *